April 14, 1959    H. J. CLIFFORD ET AL    2,881,616
THERMOSTATIC POWER ELEMENTS
Filed June 20, 1956
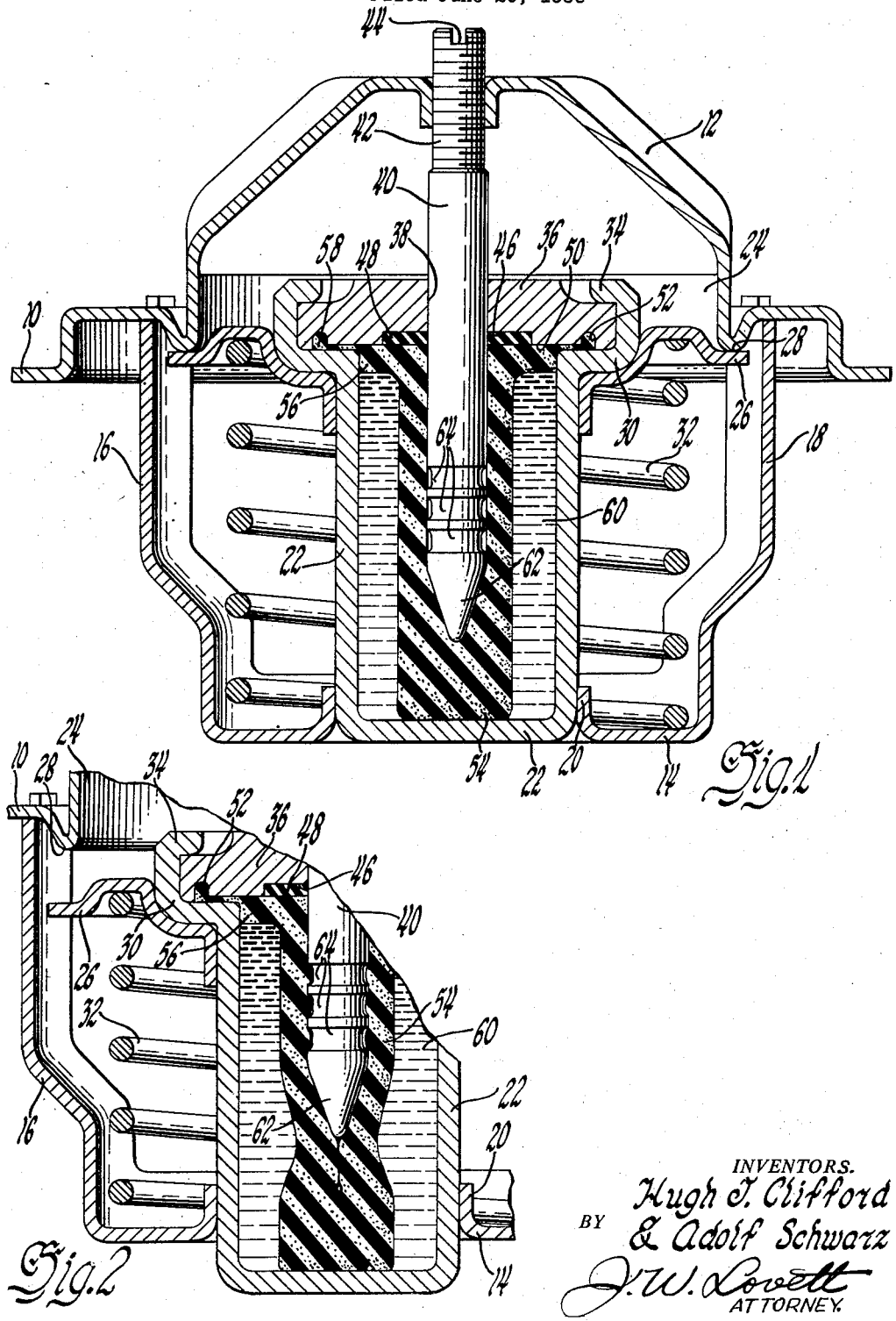
INVENTORS.
Hugh J. Clifford
BY  & Adolf Schwarz
J.W. Lovett
ATTORNEY.

United States Patent Office

2,881,616
Patented Apr. 14, 1959

2,881,616

THERMOSTATIC POWER ELEMENTS

Hugh J. Clifford and Adolf Schwarz, Lockport, N.Y., assignors to General Motors Corporation, Detroit, Mich., a corporation of Delaware Application June 20, 1956, Serial No. 592,585

3 Claims. (Cl. 73—363)

This invention relates to power elements and more particularly to pellet-type thermostatic actuating mechanisms for operating devices such as valves.

In automobiles it is conventional to employ thermo-responsive valves preventing the circulation of engine coolants through the radiators until the engines are of such temperature as to perform properly. In such a valve, the actuating mechanism may take any of various forms such as a bellows or a pellet of some thermo-sensitive material. A pellet-type thermostat is disclosed in the United States application for patent Serial No. 510,210, filed May 23, 1955, in the names of Hugh J. Clifford and Adolf Schwarz and entitled "Thermo-Responsive Control Valve Assembly."

The pellet-type actuating mechanism or power element utilized in the teaching of the above referred to application comprises a housing, a pin slidably projecting into the housing and having a tapered end embedded in an elastomeric plug and the latter being surrounded by a waxy material expansible by the application of heat and enclosed by the housing. Such power elements have proven satisfactory in operation, but it has become apparent that it is desirable to cause such elements to operate over a narrower temperature range in opening and also in closing—i.e.—the device such as a valve actuated by the power element should open later and at a slower rate upon the rising of the coolant temperature. The valve should also close at a slower rate upon dropping of the coolant temperature.

An object of the present invention is to provide an improved pellet-type power element having a restricted or narrow operative temperature range in effecting motion in either of two directions. Another object is to provide a means of control in the operation of a thermostatic power element actuated by thermo-sensitive material.

To these ends, a feature of the invention is a pin with a tapered end and a cylindrical portion having an irregular surface presenting shoulders extending transverse to the pin and contacted by a deformable elastomeric plug. Another feature is a housing containing a plug of elastomeric material extending from one end to the other of the housing and a pin extending into the housing and plug and having a surface including lateral shoulders contacting the plug material and being so placed as to resist relative motion between the pin and plug.

These and other important features of the invention will now be described in detail in the specification and then pointed out more particularly in the appended claims.

In the drawings:

Fig. 1 is a sectional view of a valve assembly employing a power element in which a preferred form of the present invention is embodied; and Fig. 2 is a partial view of the structure shown in Fig. 1 but depicting the parts in open-valve positions.

The valve assembly includes a frame having an annular flange 10 as a support bridging a conduit controlled by the assembly, an arched portion 12 and a base plate 14 joined to the flange by two arms 16 and 18. The plate 14 is centrally apertured and flanged at 20 slidably to receive a cylindrical housing 22. A cylindrical flange 24 on the frame defines an opening controlled by a valve or valve disc 26. The latter is adapted to seat on an annular portion 28 integral with the frame. The valve is centrally apertured to receive and bear against an annular shoulder portion 30 formed on the housing 22. Contact between valve 26 and the housing is maintained by a coil spring 32 which is interposed between the base 14 and the valve 26.

The annular shoulder portion 30 is inwardly flanged as at 34 tightly to retain the circular margin of a disc 36. The latter is centrally apertured as at 38 slidably to receive a pin 40. The latter is threaded as at 42 for attachment to the arch portion 12. A kerf is formed in the exposed end of the pin 40 so that the pin can be moved axially with respect to the frame as a matter of adjustment in positioning the parts.

The underside of the disc 36 is recessed as at 46 to receive a disc 48 of Teflon which is a non-abrasive plastic material and is adapted to move relatively to the pin 40 upon being urged and without any undue friction and, at the same time, serve as a sealing medium against any abrading of the elastomeric material employed. The disc 36 also includes a shallow recess 50 which is concentric with the recess 46 and defined by a slightly deeper and annular recess 52.

A plug 54 of deformable elastomeric material is arranged within the housing 22 and extends from one end of the interior thereof to the other end. This plug is made in a form having a relatively constant diameter for a major portion of its length and with a thickened shoulder portion 56 at its top and another portion 58 of greater diameter and of sufficient volume to fill the shallow recess 50 and the deeper recess 52.

A temperature sensitive waxy material 60 is placed within the housing 22 to surround the plug 54 for the major and normally constant diameter length of the latter.

The pin 40 bears a tapered end 62 and a cylindrical portion formed with an irregular surface such as the three annular notches 64. The remaining portion of the pin 40; that is, the portion which passes through the disc 36, is such as to provide a smooth surface contact with the plug 54, the Teflon disc 48 and the wall of bore 38 in the plate 36. There is no adhesion between the pin 40 and the plug 54. The contact is frictional with the coefficient of friction dependent upon the specific results desired and the specific composition employed in making the plug.

Except for the annular notches or irregular surface on the pin 40, the structure herein disclosed is much like that of the United States application Serial No. 510,210, heretofore referred to. In operation, the application of heat will cause the waxy material 60 to expand and this causes a squeeze action of the elastomeric material 54 on tapered end 62 of the pin 40 so that the latter tends to be displaced a distance dependent upon the extent of expansion of the wax 60. The housing 22 prevents the increase in volume of the wax from flowing in any direction except inwardly to displace the pin 40, as shown in Fig. 2. The irregular surface on the pin in the form of the notches 64 serves to resist relative motion between the pin and the plug 54 so that actuation of the valve is delayed a longer time than if the notches 64 were replaced by a smooth surface.

After the valve is open by displacement of the pin from the rubber plug, as shown in Fig. 2, the application of a cooling medium to the housing 22 tends to cause closure of the valve 26 because of the contraction of the waxy material 60 and the expansion of the spring 32. Again, activation of the valve is delayed because of the friction engendered by the elastomeric material entering the notches 64. The total effect is a narrowing of the operative temperature range of the power unit for imparting valve motion in either direction when the irregular surface is provided on the pin 40. As seen in Fig. 2, the elastomeric material enters the notches to some extent in effecting the retardant action.

The plug 54 is of synthetic rubber such as Ameripol as it possesses nerve and ability to flow under pressure while remaining cohesive. This material tends resiliently to hold its shape but is readily deformed with substantially no reduction in volume when subjected to pressure.

Surrounding the plug 54 is a material hereinbefore termed as a waxy material. This is a mixture of waxes and may be of the nature of such materials as is shown in the United States patents to Horne 925,773 dated June 22, 1909, and Vernet et al. 2,259,846 dated October 21, 1941.

By way of further explanation of the function of the irregular surface on the pin 40, it may be stated that the shoulders formed on that pin extending transverse to the latter and existing because of the notches 64 serve as a drag. They act as damping means to suppress a too rapid movement of the elastomeric material and the valve 26 with respect to the stationary pin.

We claim:

1. A thermostatic pellet-type power element comprising a housing, a pin slidably projecting into said housing and having a tapered end and a cylindrical portion within the housing, the said portion being provided with an irregular surface presenting shoulders extending transverse to the pin, a deformable plug of elastomeric material closely contacting and surrounding said tapered end and irregular surface, and thermo-responsive waxy material surrounding said plug and enclosed by said housing.

2. A thermostatic pellet-type power element comprising a housing, a pin slidably projecting into said housing and having a tapered end and a cylindrical portion within the housing, said portion being provided with an irregular surface presenting shoulders extending transverse to the pin length, a frame supporting said pin to direct said tapered end in one direction, means including a spring associated with said frame and urging said housing in the other direction, a deformable plug surrounded by thermo-responsive material located in said housing, and said tapered end and irregular surface being embedded in said plug.

3. A thermostatic pellet-type power element comprising a cylindrical housing, a frame slidably receiving said housing, a pin fixed to said frame and extending into said housing in one direction, means including a coil spring engaging said frame and urging said housing in the other direction, said pin having a tapered end and a cylindrical portion within said housing, a plug of deformable elastomeric material extending from one end of said housing to the other, said cylindrical portion having shoulders formed therein extending transverse to the pin length and frictionally engaging the material of said plug, thermo-responsive waxy material surrounding said plug and enclosed by said housing, and the arrangement being such that application of heat will cause expansion of said waxy material, displacement of said pin within said plug against the action of said spring and promote resistance by said shoulders to said displacement.

References Cited in the file of this patent

UNITED STATES PATENTS

| 2,208,149 | Vernet | July 16, 1940 |
| 2,356,958 | Von Wangenheim | Aug. 29, 1944 |
| 2,777,638 | Wood | Jan. 15, 1957 |